United States Patent
Furukawa et al.

(10) Patent No.: US 6,197,989 B1
(45) Date of Patent: Mar. 6, 2001

(54) FLUORINATED ORGANOSILICON COMPOUNDS AND PROCESS FOR THE PREPARATION THEREOF

(75) Inventors: Yutaka Furukawa; Mami Kotera, both of Yokohama; Seisaku Kumai, Fujisawa, all of (JP); Robert E. Ruckle, Jr., Brewster; Gerald J. Murphy, Hopewell Junction, both of NY (US)

(73) Assignees: Asahi Glass Company Ltd., Tokyo (JP); OSi Specialties, Inc., Greenwich, CT (US)

( * ) Notice: Subject to any disclaimer, the term of this patent is extended or adjusted under 35 U.S.C. 154(b) by 0 days.

(21) Appl. No.: 09/147,542

(22) PCT Filed: Jul. 15, 1997

(86) PCT No.: PCT/JP97/02449

§ 371 Date: Mar. 17, 1999

§ 102(e) Date: Mar. 17, 1999

(87) PCT Pub. No.: WO98/03574

PCT Pub. Date: Jan. 29, 1998

(30) Foreign Application Priority Data

Jul. 18, 1996 (JP) .................................... 8-207776

(51) Int. Cl.[7] ....................................................... C07F 7/02
(52) U.S. Cl. .......................... 556/450; 556/457; 556/467; 556/488
(58) Field of Search .................................. 556/450, 449, 556/454, 457, 467, 497, 488

(56) References Cited

U.S. PATENT DOCUMENTS

| | | | |
|---|---|---|---|
| 4,689,383 | * 8/1987 | Riffle et al. | ............... 528/12 |
| 5,568,239 | 10/1996 | Furukawa et al. . | |
| 5,663,399 | 9/1997 | Furukawa et al. . | |
| 5,728,903 | 3/1998 | Furukawa et al. . | |
| 5,834,614 | 11/1998 | Furukawa et al. . | |

FOREIGN PATENT DOCUMENTS

| | | |
|---|---|---|
| 0 640 888 | 3/1995 | (EP) . |
| 64-83085 | 3/1989 | (JP) . |
| 7-53719 | 2/1995 | (JP) . |

OTHER PUBLICATIONS

JP 60–94485 (A) by Fujii et al (filed as part of the PCT report on PCT/JP97/02449), Oct. 1985.*
JP 60–94486 (A) by Fujii et al (filed as part of the PCT report on PCT/JP97/02449), Oct. 1985.*
CA:123:12008 abs of JP06322294, Nov. 1994.*
CA:127:294971 abs of JP09241381, Sep. 1997.*
CA:126:32656 abs of JP08253659, Oct. 1996.*

* cited by examiner

*Primary Examiner*—Jean F. Vollano
(74) *Attorney, Agent, or Firm*—Oblon, Spivak, McClelland, Maier & Neustadt, P.C.

(57) ABSTRACT

A fluorine-containing organic silicon compound represented by the following formula 1, which is useful as various industrial base materials required to have performances such as water and oil repellency, anti-fouling properties or release properties and as raw materials therefor. Here, $A^f$ represents a specific polyfluorohydrocarbon group-containing organic group; $R^1$ and $R^2$ which are independent of each other, represent bivalent organic groups; $R^3$ to $R^9$ which are independent of one another, represent monovalent organic groups; a is an integer of at least 1, and b is an integer of at least 0:

Formula 1

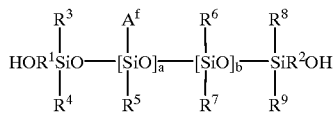

10 Claims, No Drawings

FLUORINATED ORGANOSILICON COMPOUNDS AND PROCESS FOR THE PREPARATION THEREOF

This application is the national phase of PCT/JP97/02449, filed Jul. 15, 1997, now WO 98/03574.

TECHNICAL FIELD

The present invention relates to a novel fluorine-containing organic silicon compound and a method for its production. More particularly, it relates to a fluorine-containing organic silicon compound having, at both terminals of the molecule, hydroxyl groups bonded to Si groups via specific connecting groups. The compound of the present invention is useful for various industrial base materials which are required to have performances such as water and oil repellency, anti-fouling properties or release properties and as raw materials therefor.

BACKGROUND ART

A fluorine-containing organic silicon compound has been applied to various industrial fields by virtue of its nature such as its lubricating properties, water and oil repellency, oil resistance or chemical resistance. For example, it has been added to e.g. a resin to impart the above mentioned various properties to the resin.

As an example of such a fluorine-containing organic silicon compound, a fluorine-containing silicon oil represented by the following formula 15 may be mentioned.

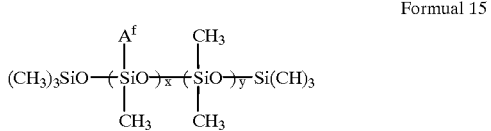

Formual 15

Further, as a compound having a functional group incorporated to a fluorine-containing organic silicon compound, JP-A-8-109260 discloses a fluorine-containing organic silicon compound having a hydroxyl group which is directly bonded to a silicon atom at at least one terminal of the molecule.

The fluorine-containing organic silicon compound represented by the above formula 15 has had a problem that even if it is added to e.g. a resin for the purpose of imparting the above mentioned respective properties, the fluorine-containing organic silicon compound will ooze out on the resin surface as the time passes, whereby it has been difficult to impart the nature of the fluorine-containing organic silicon compound over a long period of time.

On the other hand, the fluorine-containing organic silicon compound disclosed in JP-A-8-109260 has a drawback such that the hydroxyl group directly bonded to the silicon atom is susceptible hydrolysis by a reaction with e.g. a hydroxyl group in air.

DISCLOSURE OF THE INVENTION

The present inventors have conducted a research strenuously to solve the above mentioned conventional problems and as a result, have found that a fluorine-containing organic silicon compound represented by the following formula 1 is capable of solving the above mentioned problems. The compound represented by the following formula 1 has, at both terminals of the molecule, hydroxyl groups bonded to Si groups via specific connecting groups, whereby when it is added to e.g. a resin, the hydroxyl group will have an inter action with the resin, and further, if the resin has a functional group reactive with a hydroxyl group, the two will react, so that it can stay in the resin over a long period of time, and it is capable of continuously imparting the nature of the fluorine-containing organic silicon compound over a long period of time. Further, the hydroxyl groups in the fluorine-containing organic silicon compound are bonded to Si groups via specific connecting groups, whereby the hydroxyl groups are not susceptible to hydrolysis, whereby there is a merit that the stability of the compound is high.

Namely, the present invention provides a fluorine-containing organic silicon compound represented by the following formula 1:

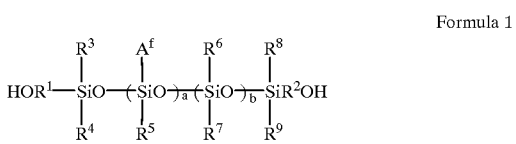

Formula 1

$A^1-X^1-$     Formula 2

$A^2-X^2-O-X^3-$     Formual 3

$A^3-X^4-O-X^5-$     Formula 4

{In the formula 1, $A^f$ is at least one member selected from monovalent polyfluorohydrocarbon group-containing organic groups represented by the formulae 2, 3 and 4 provided that in the formulae 2 to 4, $A^1$ represents a 2 monovalent polyfluorohydrocarbon group; $A^2$ represents a monovalent polyfluorohydrocarbon group containing an etheric oxygen atom; $A^3$ represents a monovalent polyfluorohydrocarbon group; $X^1$, $X^2$, $X^3$, $X^4$ and $X^5$ which are independent of one another, represent bivalent hydrocarbon groups; $R^1$ and $R^2$ which are independent of each other, represent bivalent organic groups; $R^3$ to $R^9$ which are independent of one another, represent monovalent organic groups; a is an integer of at least 1, and b is an integer of at least 0.}

Further, the present invention provides a method for producing a fluorine-containing organic silicon compound, which comprises adding at least one member selected from fluorine-containing unsaturated compounds represented by the following formulae 9, 10 and 11, to a H—Si group-containing organic silicon compound represented by the following formula 8:

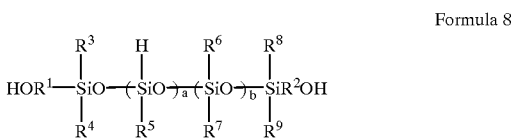

Formula 8

$A^1-X^1-(CH_2)_rCH_2CH=CH_2$     Formula 9

$A^2-X^2-O-(CH_2)_sCH_2CH=CH_2$     Formula 10

$A^3-X^4-O-(CH_2)_tCH_2CH=CH_2$     Formula 11

(In the formula 8, $R^3$ to $R^9$ which are independent of one another, represent monovalent organic groups; a is an integer of at least 1, and b is an integer of at least 0.)

(In the formulae 9 to 11, $A^1$ represents a monovalent 2 polyfluorohydrocarbon group; $A^2$ represents a monovalent polyfluorohydrocarbon group containing an etheric oxygen atom; $A^3$ represents a monovalent polyfluorohydrocarbon group; $X^1$, $X^2$ and $X^4$ which are independent of one another, represent bivalent hydrocarbon groups; and r, s and t which are independent of one another, represent integers of from 0 to 7.)

Still further, the present invention provides a method for producing a fluorine-containing organic silicon organic compound represented by the formula 1, which comprises subjecting a fluorine-containing cyclic compound represented by the following formula 13 to ring-opening polymerization in the presence of a compound represented by the following formula 12, if necessary together with a hydrocarbon type cyclic compound represented by the following formula 14:

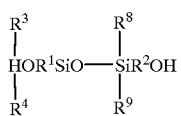

Formula 12

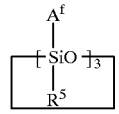

Formula 13

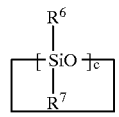

Formula 14

(In the fomulae 12 to 14, $A^F$ and $R^3$ to $R^9$ are as defined in the formula 1; and c is an integer of at least 3.)

BEST MODE FOR CARRYING OUT THE INVENTION

Now, the fluorine-containing organic compound of the present invention and the method for its production will be described in detail.

The fluorine-containing organic silicon compound of the present invention is represented by the following formula 1:

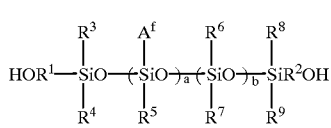

Formula 1

In the above formula 1, $R^1$ and $R^2$ which are independent of each other, represent bivalent organic groups, and $R^3$ to $R^9$ which are independent of one another, represent monovalent organic groups. Here, "organic groups" are groups containing carbon, preferably hydrocarbon groups. In this specification, "hydrocarbon groups" mean groups comprising carbon atoms and hydrogen atoms, unless otherwise specified. The hydrocarbon groups may be aromatic hydrocarbon groups or aliphatic hydrocarbon groups, but they are preferably aliphatic hydrocarbon groups, particularly preferably alkyl groups.

$R^3$ to $R^9$ are preferably monovalent hydrocarbon groups, particularly preferably alkyl groups. Further, $R^1$ and $R^2$ are preferably bivalent hydrocarbon groups, particularly preferably alkylene groups. The number of carbon atoms of these alkyl groups and alkylene groups is preferably from about 1 to 10, particularly preferably from 1 to 4. The alkyl groups and the alkylene groups are, respectively, preferably of straight chain structures.

In the above formula 1, $A^f$ represents at least one member selected from monovalent polyfluorocarbon group-containing organic groups represented by the following formulae 2, 3 and 4, preferably one member:

$A^1$—$X^1$—  Formula 2

$A^2$—$X^2$—O—$X^3$—  Formula 3

$A^3$—$X^4$—O—$X^5$—  Formula 4

In the formulae 2 to 4, $A^1$ and $A^3$ which are independent of each other, represent monovalent polyfluorohydrocarbon groups, and $A^2$ represents a monovalent polyfluorohydrocarbon group containing an etheric oxygen atom.

"A polyfluorohydrocarbon group" is a group having at least two hydrogen atoms of a hydrocarbon group substituted by fluorine atoms and is preferably a polyfluoroalkyl group. Further, "a polyfluorohydrocarbon group containing an etheric oxygen atom" is a group having an etheric oxygen atom inserted between a carbon—carbon bond of the above polyfluorohydrocarbon group and is preferably a group containing a polyfluoroxyalkylene moiety.

The number of fluorine atoms in the polyfluorohydrocarbon group is preferably at least 60%, particularly preferably at least 80%, more preferably substantially 100%, i.e. a group in which substantially all of hydrogen atoms of the hydrocarbon group are substituted by fluorine atoms ("a perfluorohydrocarbon group"), when it is represented by (the number of fluorine atoms in the polyfluorohydrocarbon group)/(the number of hydrogen atoms in a hydrocarbon group having the same number of carbon atoms corresponding to the polyfluorohydrocarbon group)×100(%).

These polyfluorohydrocarbon groups may be of a structure of either straight chain or branched, particularly preferably a straight chain structure. In the case of a branched structure, the branched moiety is preferably a short chain having from about 1 to 3 carbon atoms, and it preferably has a structure wherein the branched moieties are present at terminal portions of $A^1$, $A^2$ and $A^3$, respectively.

$A^1$ and $A^3$ are preferably polyfluoroalkyl groups, and perfluoroalkyl groups are preferred. As specific examples, the following examples may be mentioned. Further, the following specific examples include groups corresponding to the respective structural isomeric groups.

$C_4F_9$— {including structural isomeric groups such as $CF_3(CF_2)_3$—, $(CF_3)_2CFCF_2$—, $(CF_3)_3C$—, and $CF_3CF_2CF(CF_3)$—}, $C_5F_{11}$— {including structural isomeric groups such as $CF_3(CF_2)_4$—, $(CF_3)_2CF(CF_2)_2$—, $(CF_3)_3CCF_2$, and $CF_3(CF_2)_2CF(CF_3)$—}, $C_6F_{13}$— {including structural isomeric groups such as $CF_3(CF_2)_2C(CF_3)_2$—}, $C_8F_{17}$—, $C_{10}F_{21}$—, $C_{12}F_{25}$—, $C_{14}F_{29}$—, $C_{16}F_{33}$—, $C_{18}F_{37}$—, $C_{20}F_{41}$—, $(CF_3)_2CF(CF_2)_s$— (s is an integer of 0 or at least 1), and $HC_tF_{2t}$— (t is an integer of 0 or at least 1).

$A^2$ is preferably a group containing a polyfluoroxy alkylene moiety, particularly preferably a group containing a perfluoroxy alkylene moiety. Further, $A^2$ is preferably a group which contains a perfluoroxy alkylene moiety and in which the terminal is a perfluoroalkyl group. As such a perfluoroxyalkylene, perfluoroxymethylene, perfluoroxyethylene, perfluoroxypropylene or perfluoroxybutylene may, for example, be mentioned.

The following examples may be mentioned as specific examples of the $A^2$ group. Further, the following specific examples include groups corresponding to the respective structural isomeric groups.

$CF_3(CF_2)_4OCF(CF_3)$—, $F[CF(CF_3)CF_2O]_uCF(CF_3)CF_2CF_2$— (u is an integer of at least 1), $F[CF(CF_3)CF_2O]_rCF(CF_3)$— (r is an integer of at least 1), $F(CF_2CF_2CF_2O)_vCF_2CF_2$— (v is an integer of at least 1), and $F(CF_2CF_2O)_wCF_2CF_2$— (w is an integer of at least 1).

Further, in the formulae 2 to 4, $X^1$, $X^2$, $X^3$, $X^4$ and $X^5$ which are independent of one another, represent bivalent hydrocarbon groups. As such a bivalent hydrocarbon group, an alkylene group is preferred, and it may be of a structure of either straight chain or branched. However, in the present invention, a straight chain alkylene group represented by —$(CH_2)_p$— (wherein p is an integer of from 1 to 10, preferably from 2 to 4) is preferred. In the case of a branched structure, it is preferably one having a short chain wherein the number of carbon atoms of the branched moiety is from about 1 to 3.

In the present invention, the above formula 2 is represented preferably by the following formula 5. However, in the formula 5, n is an integer of from 4 to 18, preferably an integer of from 6 to 12, and $X^1$ is as defined above and is preferably a straight chain alkylene group.

$$C_nF_{2n+1}\text{—}X^1\text{—} \qquad \text{Formula 5}$$

Specific examples of the formula 5 will be given below for the purpose of the illustration, but examples are not limited thereto.

$C_4F_9$—$(CH_2)_2$—, $C_4F_9$—$(CH_2)_3$—, $C_4F_9$—$(CH_2)_4$—, $C_5F_{11}$—$(CH_2)_2$—, $C_5F_{11}$—$(CH_2)_3$, $C_6F_{13}$—$(CH_2)_2$—, $C_8F_{17}$—$(CH_2)_2$—, $C_8F_{17}$—$(CH_2)_3$—, $C_8F_{17}$—$(CH_2)_4$—, $C_9F_{19}$—$(CH_2)_2$—, $C_9F_{19}$—$(CH_2)_3$—, $C_{10}F_{21}$—$(CH\,2)_2$.

Further, in the present invention, the above formula 3 is represented preferably by the following formula 6. However, in the formula 6, m is an integer of from 1 to 10, preferably from 1 to 5, and $X^2$ and $X^3$ are respectively as defined above, and preferably straight chain alkylene groups.

$$F[CF(CF_3)CF_2O]_mCF(CF_3)\text{—}X^2\text{—}O\text{—}X^3\text{—} \qquad \text{Formula 6}$$

Specific examples of the formula 6 will be given for the purpose of the illustration, but examples are not limited thereto.

$F[CF(CF_3)CF_2O]_2CF(CF_3)CH_2O(CH_2)_3$—, $F[CF(CF_3)CF_2O]_4CF(CF_3)CH_2O(CH_2)_3$—, $F(CF_2CF_2CF_2O)_2CF_2CF_2CH_2O(CH_2)_3$—.

Further, in the present invention, the above formula 4 is represented preferably by the following formula 7. However, in the formula 7, k is an integer of from 1 to 18, preferably from 4 to 12, and $X^4$ and $X^5$ are as defined above, respectively.

$$C_kF_{2k+1}\text{—}X^4O\text{—}X^5\text{—} \qquad \text{Formula 7}$$

Specific examples of the formula 7 will be given for the purpose of the illustration, but examples are not limited thereto.

$C_4F_9$—$(CH_2)_2$—O—$(CH_2)_3$—, $C_6F_{13}$—$(CH_2)_2$—O—$(CH_2)_3$—, $C_8F_{17}$—$(CH_2)_2$—O—$(CH_2)_3$—, $C_8F_{17}$—$(CH_2)_3$—O—$(CH_2)_3$—.

In the above formula 1, a is an integer of at least 1, preferably from 5 to 500, more preferably from 15 to 30, and b is an integer of at least 0, preferably from 5 to 1,000, particularly preferably from 25 to 40. A case wherein b is 0, means that there is no $(R^6)(R^7)SiO_{2/2}$ unit present in the compound represented by the formula 1. The ratio of a/b may optionally be changed depending upon the fluorine content, but is preferably from 1/0.5 to 1/9, particularly preferably from 1/1 to 1/3. Further, $10 \leq (a+b) \leq 70$ is preferred, and $20 \leq (a+b) \leq 40$ is particularly preferred.

The fluorine-containing organic silicon compound represented by the formula 1 of the present invention, is preferably an oil at room temperature. Accordingly, its molecular weight is preferably from about $1 \times 10^3$ to $1 \times 10^6$, more preferably from $5 \times 10^3$ to $15 \times 10^3$.

Further, the fluorine content in the fluorine-containing organic silicon compound represented by the formula 1 is preferably from 15 to 90 wt %, more preferably from 15 to 70 wt %.

Further, the representation of the fluorine-containing organic silicon compound of the formula 1 of the present invention includes every case of a block polymer and a random polymer. The same applies with respect to the representation of other compounds.

As specific examples of the fluorine-containing organic silicon compound represented by the formula 1 of the present invention, the following may be mentioned, but they are not limited to such specific examples.

(i) Examples containing the group represented by the formula 2 (a is an integer of at least 1, preferably an integer of from 10 to 50; and b is an integer of at least 0, preferably an integer of from 20 to 60.):

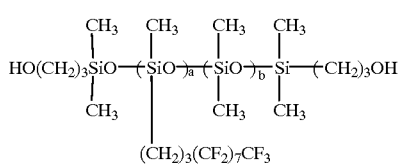

Formula 30

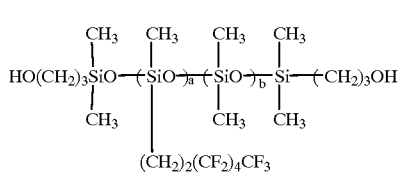

Formula 16

(ii) Examples containing the group represented by the formula 3 (a is an integer of at least 1, preferably an integer of from 10 to 50; and b is an integer of at least 0, preferably an integer of from 20 to 60.):

Formula 17
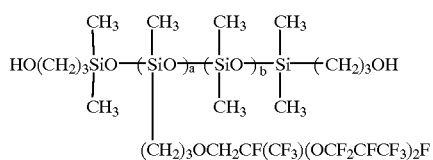

Formula 19
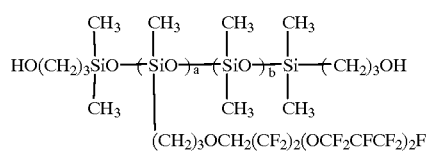

(iii) Examples containing the group represented by the formula 4 (a is an integer of at least 1, preferably an integer of from 10 to 50, and b is an integer of at least 0, preferably an integer of from 20 to 60.):

Formula 20
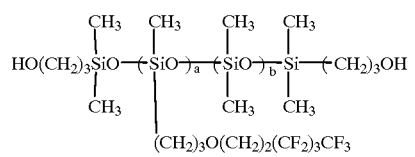

Formula 21
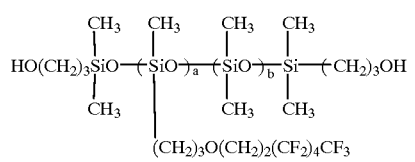

Formula 22
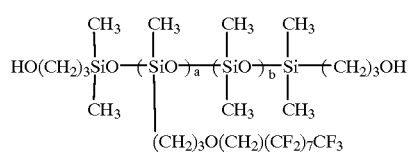

Formula 23
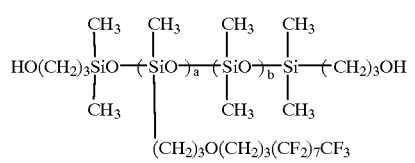

The fluorine-containing organic silicon compound of the present invention is characterized in that at least one monovalent polyfluorohydrocarbon group selected from the above formulae 2 to 4, preferably at least one monovalent polyfluorohydrocarbon group selected from formulae 5 to 7, is bonded to a silicon atom.

The fluorine-containing organic silicon compound represented by the above formula 1 of the present invention can be prepared mainly by the following two preparation methods. Namely, they are a method of adding at least one member selected from the fluorine-containing unsaturated compounds represented by the formulae 9 to 11 to a H—Si group-containing organic silicon compound represented by the formula S in the presence of a transition metal catalyst ("hydrosilylation"; preparation method 1), and a method of subjecting a fluorine-containing cyclic compound represented by the formula 13 to ring-opening polymerization in the presence of a compound of the formula 12, if necessary together with a cyclic siloxane represented by the formula 14, by using an acid catalyst such as a trifluoromethane sulfonic acid (preparation method 2).

Firstly, in the preparation method 1, at least one member selected from fluorine-containing unsaturated compounds represented by the following formulae 9, 10 and 11, is added to a H—Si group-containing organic silicon compound represented by the following formula 8 (hereinafter referred to as "the hydrosilicone compound"), whereby a fluorine-containing organic silicon compound represented by the formula 1 wherein $X^1$, $X^3$ and $X^5$ are —$(CH_2)_q$— (wherein q is an integer of from 3 to 10), is produced.

The definitions of the respective substituents in the formulae 8 to 10, have the same meanings, respectively, as the definitions of the respective groups described with respect to the above formulae 1 to 7, and r, s and t represent integers of from 0 to 7, respectively. Preferred is a case wherein r, s and t are 0, respectively.

Formula 8
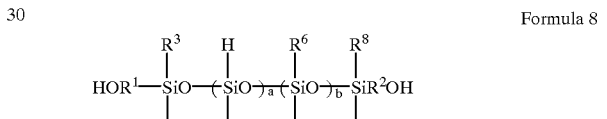

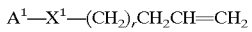  Formula 9
  Formula 10
  Formula 11

In the preparation method 1, a fluorine-containing unsaturated compound of the formula 9 to 11 can be added to the H—Si moiety of the compound represented by the formula 8. At least one member may be used with respect to each of the compounds of the formulae 9 to 11. In a case where two or more members are to be used, they are preferably ones wherein $A^1$, $A^2$ and $A^3$ moieties are groups having different numbers of carbon atoms.

The hydrosilylation may be carried out in the presence of a solvent or substantially in the absence of a solvent. It is preferred to carry out it in the absence of a solvent. In the case where the solvent is absent, the amount of a solvent contained in the reaction system is preferably 0 (not contained at all), but may be a solvent amount to be used for the preparation of a reagent to be used for the reaction, for example, a very mall amount at a level of a solvent amount required to dissolve the catalyst, without any particular problem, and the amount of the solvent in the reaction system may be at most 1 wt %, preferably from 0 to 0.1 wt %. By carrying out the reaction substantially in the absence of the solvent, there will be advantages that no solvent will remain in the fluorine-containing organic silicon compound represented by the formula 1 of the present invention as the product, and a product of high quality can be obtained. Further, post treatment after the reaction will be simple and easy.

The hydrosilylation is preferably carried out in the presence of a catalyst. As the catalyst, a catalyst containing a transition metal is preferred, and a catalyst containing platinum, rhodium or cobalt is particularly preferred. The reaction temperature is usually preferably at a level of from 70 to 100° C. The reaction time may be changed optionally depending upon the compound to be used, and it is usually from 0.5 to 10 hours. However, in the case of the present invention, the reaction may proceed even in a short time, and it is preferably from 0.5 to 5 hours. The amount of the catalyst is usually at a level of from 1 to 10 ppm in the reaction system. However, in the present invention, the reaction may proceed in a short time even when the amount of the catalyst is reduced, and it is preferably from

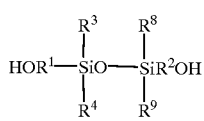

Formula 12

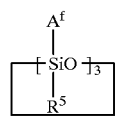

Formula 13

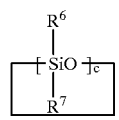

Formula 14

The amounts of the formula 13 and formula 14 to the compound represented by the formula 12 may optionally be changed depending upon the structure of the compound represented by the formula 1 as the desired product. Usually, it is preferred to use the compound represented by the formula 13 in an amount of from (a+b)/10 to (a+b)1500 mol. particularly preferably from (a+b)/40 to (a+b)/70 mol (a and b have the same meanings as a and b in the formula 1), per mol of the compound represented by the formula 12.

The ring-opening polymerization is preferably 0.01 to 10 ppm.

The amount of the fluorine-containing unsaturated compound represented by the formula 9 to 11 in the hydrosilylation, is preferably at least 1 equivalent, particularly preferably from 1.1 to 2 equivalents, per equivalent of hydrogen atoms bonded to silicon atoms in the hydrosilicone compound represented by the formula 8.

The compound represented by the formula 1 produced by the preparation method 1 is free from the possibility that it contains a volatile cyclic siloxane attributable to the raw materials or by-products, and the compound produced without using a solvent is particularly preferred, since there is no need of worrying about an adverse effect due to a residual solvent.

The fluorine-containing organic silicon compound represented by the formula 1 of the present invention can also be prepared by the ring-opening polymerization method (the preparation method 2). For example, it can be prepared by subjecting a fluorine-containing cyclic trisiloxane represented by the following formula 13 to ring-opening polymerization in the presence of a compound represented by the following formula 12, if necessary, together with a cyclic polysiloxane represented by the following formula 14. In the following formulae, A and $R^3$ to $R^9$ are as defined above, and c represents an integer of at least 3, preferably carried out in the presence of a polymerization catalyst. As the polymerization catalyst, a known acid catalyst and an alkali catalyst which are commonly used for ring-opening polymerization, may optionally be used.

As the acid catalyst, sulfuric acid or trifluoromethane sulfonic acid is preferred.

As the alkali catalyst, an alkali metal hydroxide such as sodium hydroxide, lithium hydroxide or potassium hydroxide, may, for example, be mentioned.

These catalysts are neutralized after the ring-opening polymerization and removed by e.g. filtration. Such neutralization can be carried out by an addition of a basic substance when an acid catalyst was used, or by an addition of an acetic compound in a case where the alkali catalyst was used.

The amount of the polymerization catalyst is preferably from 1 to 10,000 ppm, particularly preferably from 1 to 100 ppm, based on the total weight obtained by adding the compound represented by the formula 12, the compound represented by the formula 13 and the compound represented by the formula 14 as the case requires.

The polymerization temperature is preferably from 20 to 200° C., particularly preferably from 40 to 150° C. Further, the polymerization time is preferably from 0.5 to 10 hours.

The fluorine-containing organic silicon compound represented by the formula 1 to be produced by the ring-opening polymerization method, is preferably a compound of the formula 1 wherein $X^1$, $X^3$ and $X^5$ are, respectively, —$CH_2$— or —$CH_2CH_2$—, particularly preferably a compound wherein they are —$CH_2CH_2$.

The application of the fluorine-containing silicon compound of the present invention is not particularly limited, and by the addition to a functional oil, a resin or a rubber, it is possible to lower the surface tension or the refractive index or to impart an electrical insulation property, a release property, water repellency, a defoaming property, oil resistance, solvent resistance, a lubricating property or heat resistance. In the case of its addition to a resin, it is preferred to select a resin having groups reactive with the terminal hydroxyl groups of the fluorine-containing silicon compound, whereby there will be a merit in that the effect for preventing bleed out of the fluorine-containing silicon compound from the resin can be increased. Further, the fluorine-containing silicon compound of the present invention is free from a trouble such that terminal hydroxyl groups undergo partial hydrolysis and condensation even if moisture is present in air, whereby there is a merit such that the application environment or the conditions for storage will not be restricted.

Further, the fluorine-containing organic silicon compound represented by the formula 1 of the present invention is a compound useful as a soil resistant oil for copy rolls, various lubricating oils such as freezer oil, or vacuum pump oil, various operating oils such as tranktion oil, brake oil and coupling oil, vibration-damping oils for meters of automobiles or aircrafts, or for pickups of players, a damper oil for e.g. a dash board or a shock absorber, a lubricant for e.g. a heat sensitive transfer recording medium, a magnetic recording medium, a magnetic head or an impregnated bearing, a peeling agent, a release agent, a roll composition for a copying machine or a printer or a surface coating agent therefor, an additive to a shampoo, a rinse or various make up cosmetics, a treating agent for various powders, a water and oil repellent, a deep color processing agent, an agent for imparting lubricating properties to fibers, and insulating oils such as transformer oil, capacitor oil or cable oil, an additive to a polymer material such as plastic or coating material, as e.g. a leveling agent, a blocking preventing agent, a color irregularity-preventing agent or an orange peel-preventing agent, a plasticizer for a rubber or a resin, a modifier, a defoaming agent, a base oil for a grease compound, a foam-regulating agent, a blend oil to wax, a toner-treating agent, an oil sealing agent, a rust-proofing agent, an antiseptic agent, an antifogging agent, an additive to a pharmaceutical, or a glazing agent. Thus, it is useful in various fields including cosmetics defoaming agents, surfactants, and water and oil repellents.

Now, the present invention will be described with respect to Examples. However, the present invention is by no means restricted by such Examples.

EXAMPLE 1

A 200 cc four-necked flask equipped with a stirrer and a thermometer, was sufficiently replaced by nitrogen, and 100 g of the compound represented by the formula 31, was introduced.

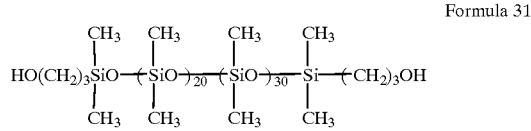

Formula 31

The temperature was raised to 90° C., and then, 260 g of $CF_3(CF_2)_7CF_2CH=CH_2$ was dropwise added from a dropping funnel. Along with the progress of the reaction, an increase of the internal temperature by about 10° C. was observed. Upon expiration of 4 hours, extinction of the monomer was confirmed, and the reaction was terminated. 0.5 g of activated carbon was introduced, and the mixture was stirred at room temperature for 1 hours, followed by filtration to obtain a transparent oil. By IR, extinction of the absorption by Si—H was confirmed. The obtained product was analyzed by NMR, whereby it was confirmed to have a structure represented by the following formula.

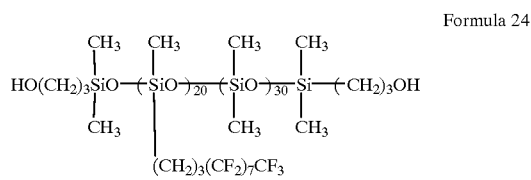

Formula 24

$^1$H-NMR (CDCl$_3$, TMS) δ (ppm):0.00 (s, CH$_3$), 0.40~0.92 (m, Si—CH$_2$), 1.61 (m, CH$_2$CF$_2$), 1.35~2.40 (m, SiCH$_2$CH$_2$), 3.53 (t, CH$_2$OH).

$^{19}$F-NMR (CDCl$_3$, CFCl$_3$) Δ (ppm):−81.7 (CF$_3$), −115.1 (CF$_2$CF$_3$), −126.9 (CH$_2$CF$_2$), −122.5~−124.1 (CF$_2$)

EXAMPLE 2

A 100 cc three-necked flask equipped with a stirrer and a thermometer, was sufficiently replaced by nitrogen, and 3.26 g of the compound represented by the following formula 25 and 40 g of the compound represented by the following formula 26 were introduced.

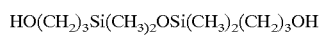  Formula 25

HO(CH$_2$)$_3$Si(CH$_3$)$_2$OSi(CH$_3$)$_2$(CH$_2$)$_3$OH

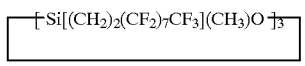

Formula 26

Further, 30 g of xylene was introduced, and then the temperature was raised to 50° C. After raising the temperature, 40 mg of trifluorosulfonic acid was introduced. Five hours later, extinction of the monomer was confirmed by gas chromatography, and 0.4 g of NaHCO$_3$ was introduced to terminate the reaction. After stirring for 1 hour, filtration was carried out to obtain a transparent oil. The obtained product was analyzed by NMR and IR, whereby it was confirmed to have a structure shown by the following formula 27.

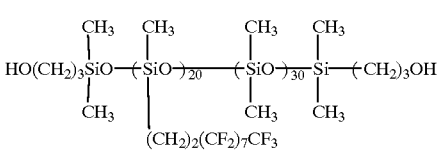

Formula 27

$^1$H-NMR (CDCl$_3$, TMS) δ (ppm): 0.00 (s, CH$_3$), 0.40~0.92 (m, Si—CH$_2$), 1.61 (m, CH$_2$CF$_2$), 1.35~2.40 (Si CH$_2$CH$_2$), 3.53 (t, CH$_2$OH).

$^{19}$F-NMR (CDCl$_3$, CFCl$_3$) δ (ppm): −81.7 (CF$_3$), −115.1 (CF$_2$)CF$_3$), −126.9 (CH$_2$CF$_2$), −122.5~124.1 (CF$_2$)

EXAMPLE 3

A transparent oil represented by the following formula 28 was obtained by dropwise adding 295 g of F[CF(CF$_3$)CF$_2$)]$_2$CF(CF$_3$)CH$_2$OCH$_2$CH=C$_2$ instead of CF$_3$(CF$_2$)$_7$CH$_2$CH=CH$_2$ in Example 1. By IR, extinction of the absorption by Si—H was confirmed, and further by NMR, it was confirmed to have a structure represented by the following formula 28.

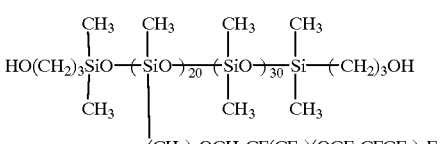

Formula 28

EXAMPLE 4

A transparent oil represented by the following formula 29 was obtained by dropwise adding 200 g of CF$_3$(CF$_2$)$_4$(CH$_2$)$_2$OCH$_2$CH=CH$_2$ instead of CF$_3$(CF$_2$)$_7$CH$_2$CH=CH$_2$ in Example 1. By IR, extinction of the absorption by Si—H was confirmed, and further by NMR, it was confirmed to have a structure represented by the following formula 29.

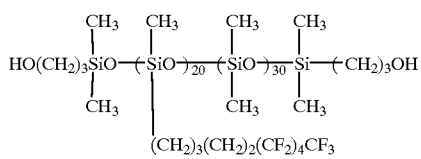

Formula 29

PREPRATION EXAMPLE

Example for preparing a vinyl type copolymer containing trialkoxysilyl groups 60 g of methyl methacrylate, 20 g of n-butyl methacrylate and 10 g of $CH_2=C(CH_3)COOCH_2CH_2CH_2Si(OCH_3)_3$ were dissolved in 67 g of xylene, and 0.5 g of benzoyl peroxide was added and reacted with stirring at a temperature of from 90 to 100° C. for 6 hours, to obtain a composition comprising a vinyl type copolymer containing trialkoxysilyl groups (hereinafter referred to as a vinyl type copolymer) and xylene. After completion of the reaction, the crude reaction solution was analyzed by gas chromatography, and it was confirmed that the peaks of the starting materials disappeared.

EXAMPLE 5

To 100 parts by weight of the composition containing a vinyl type copolymer obtained in Preparation Example (concentration of the vinyl type copolymer: 50 wt %), 4 parts by weight the compound represented by the formula 24, obtained in Example 1, was thoroughly mixed. Then, this mixture was coated on a polyethylene terephthalate (PET) film surface so that the thickness would be 50 μm, followed by heating at 200° C. for 30 minutes, to form a coating film on the PET surface. On this coating film surface, a line was drawn with an oily felt pen (black) and upon expiration of five minutes, wiped off with a paper, whereby no trace remained.

Further, said coating film was left to stand for six months, whereupon a line was drawn with an oily felt pen (black) in the same manner and upon expiration of five minutes, wiped off with a paper, whereby no trace remained.

COMPARATIVE EXAMPLE 1

Without incorporating the compound represented by the formula 24 in Example 5, a coating film was formed in the same manner. On this coating film surface, a line was drawn with an oily felt pen (black) and upon expiration of five minutes, wiped off with a paper, whereby the trace remained completely.

INDUSTRIAL APPLICABILITY

By its addition to a functional oil, a resin, a rubber or the like, the fluorine-containing organic silicon compound of the present invention is capable of lowering the surface tension or the refractive index, or imparting an electric insulating property, a release property, water repellency, a defoaming property, oil resistance, solvent resistance, a lubricating property or heat resistance, and thus it is useful for various industrial materials which are required to have properties such as water and oil repellency, an antifouling property and a release property, and as raw materials therefor.

Further, the fluorine-containing organic silicon compound of the present invention has hydroxyl groups bonded to Si groups via specific bonding groups at both terminals of the molecule, whereby when added to a resin or the like, it is capable of continuously imparting the nature of the compound. Namely, it has a merit such that when it is added to a resin, by selecting the resin so that it has groups reactive with the terminal hydroxyl groups of the fluorine-containing silicon compound, it is possible to prevent bleed out of the fluorine-containing silicon compound from the resin. Especially, a fluorine-containing silicon compound prepared by hydrosilylation, is free from a drawback that an unreacted low molecular compound will remain and thus is advantageous to prevent bleed out from the resin. Further, the fluorine-containing silicon compound of the present invention is free from a drawback that terminal hydroxyl groups undergo partial hydrolysis or condensation even in the presence of moisture in air and thus has a merit that the environment for use or the conditions for storage are not restricted.

What is claimed is:

1. A fluorine-containing organic silicon compound represented by the following formula 1:

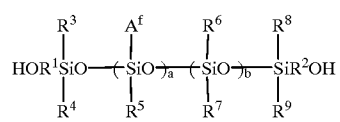

Formula 1

 Formula 2

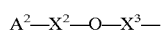 Formula 3

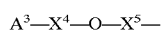 Formula 4 wherein $A^f$ is at least one member selected from monovalent polyfluorohydrocarbon group-containing organic groups represented by the formulae 2, 3 and 4 provided that in the formulae 2 to 4, $A^1$ represents a monovalent polyfluorohydrocarbon group; $A^2$ represents a monovalent polyfluorohydrocarbon group containing an etheric oxygen atom; $A^3$ represents a monovalent polyfluorohydrocarbon group; $X^1$, $X^2$, $X^3$, $X^4$ and $X^5$ which are independent of one another, represent bivalent alkylene groups; $R^1$ and $R^2$ which are independent of each other, represent bivalent alkylene groups; $R^3$ to $R^9$ which are independent of one another, represent monovalent alkyl groups; a is an integer of 1–500, and b is an integer of 0–1000.

2. The fluorine-containing organic silicon compound according to claim 1, wherein the formula 2 is represented by the following formula 5:

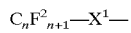 Formula 5 n is an integer of from 4 to 18, and $X^1$ is a bivalent alkylene group.

3. The fluorine-containing organic silicon compound according to claim 1, wherein the formula 3 is represented by the following formula 6:

 Formula 6 m is an integer of from 1 to 10; and $X^2$ and $X^3$ which are independent of each other, represent bivalent alkylene groups.

4. The fluorine-containing organic silicon compound according to any one of claims 1 to 3, wherein the formula 4 is represented by the following formula 7:

$$C_kF_{k+1}-X^4-O-X^5-\qquad \text{Formula 7}$$

k is an integer of from 1 to 18; and $X^4$ and $X^5$ which are independent of each other, represent bivalent alkylene groups.

5. The fluorine-containing organic silicon compound according to claim 1, wherein $X^1$, $X^2$, $X^3$, $X^4$ and $X^5$ which are independent of one another, represent bivalent alkylene groups represented by $-(CH_2)_p-$ and p is an integer of from 1 to 10.

6. The fluorine-containing organic silicon compound according to claim 1, wherein $X^1$, $X^3$ and $X^5$ which are independent of one another, represent bivalent alkylene groups represented by $-(CH_2)_q-$ and q is an integer of from 3 to 10.

7. A method for producing a fluorine-containing organic silicon compound of claim 6, which comprises adding at least one member selected from fluorine-containing unsaturated compounds represented by the following formulae 9, 10 and 11, to a H—Si group-containing organic silicon compound represented by the following formula 8:

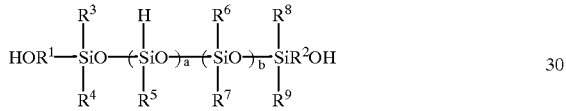

Formula 8

$$A^1-X^1-(CH_2)_rCH_2CH=CH_2 \qquad \text{Formula 9}$$

$$A^2-X^2-O-(CH_2)_sCH_2CH=CH_2 \qquad \text{Formula 10}$$

$$A^3-X^4-O-(CH_2)_tCH_3CH=CH_2 \qquad \text{Formula 11}$$

wherein $R^3$ to $R^9$ which are independent of one another, represent monovalent alkyl groups; a is an integer of 1–500, and b is an integer of 0–1000; and $A^1$ represents a monovalent polyfluorohydrocarbon group; $A^2$ represents a monovalent polyfluorohydrocarbon group containing an etheric oxygen atom; $A^3$ represents a monovalent polyfluorohydrocarbon group; $X^1$, $X^2$ and $X^4$ which are independent of one another, represent bivalent hydrocarbon groups; and r, s and t which are independent of one another, represent integers of from 0 to 7.

8. A method for producing a fluorine-containing organic silicon organic compound of claim 1, which comprises subjecting a fluorine-containing cyclic compound represented by the following formula 13 to ring-opening polymerization in the presence of a compound represented by the following formula 12, if necessary together with a hydrocarbon type cyclic compound represented by the following formula 14:

Formula 12

Formula 13

Formula 14

$$A^1-X^1- \qquad \text{Formula 2}$$

$$A^2-X^2-O-X^3- \qquad \text{Formula 3}$$

$$A^3-X^4-O-X^5- \qquad \text{Formula 4}$$

wherein $R^1$ to $R^9$ which are independent of one another, represent monovalent organic groups; $A^f$ represents at least one member selected from polyfluorohydrocarbon group-containing groups represented by the formulae 2, 3 and 4 and $A^1$ represents a monovalent polyfluorohydrocarbon group; $A^2$ represents a monovalent polyflurohydrocarbon group containing an etheric oxygen atom; $A^3$ represents a monovalent polyfluorohydrocarbon group; and $X^1$, $X^2$, $X^3$, $X^4$ and $X^5$ which are independent of one another, represent bivalent alkylene groups; and c is 3 or 4.

9. The fluorine-containing organic silicon compound of claim 1, wherein a is 1 to 50 and b is 0 to 60.

10. The fluorine-containing organic silicon compound of claim 1, wherein a is 10 to 50 and b is 20 to 60.

* * * * *

UNITED STATES PATENT AND TRADEMARK OFFICE
CERTIFICATE OF CORRECTION

PATENT NO. : 6,197,989 B1
DATED : March 6, 2001
INVENTOR(S) : Furukawa et al.

It is certified that error appears in the above-identified patent and that said Letters Patent is hereby corrected as shown below:

<u>Title page,</u>
Item [73], the Assignee information is incorrect. Item [73] should read:
-- [73] Assignees: Asahi Glass Company Ltd., Tokyo (JP);
Crompton Corporation, Greenwich, CT (US) --

Signed and Sealed this

Sixth Day of November, 2001

Attest:

NICHOLAS P. GODICI
Attesting Officer
Acting Director of the United States Patent and Trademark Office